(12) United States Patent
Kawashima et al.

(10) Patent No.: US 7,392,705 B2
(45) Date of Patent: Jul. 1, 2008

(54) ULTRASONIC SENSOR

(75) Inventors: Yasuhiro Kawashima, Kariya (JP); Hiroyuki Kani, Kariya (JP); Akira Nakajima, Kariya (JP)

(73) Assignee: Denso Corporation (JP)

( * ) Notice: Subject to any disclaimer, the term of this patent is extended or adjusted under 35 U.S.C. 154(b) by 116 days.

(21) Appl. No.: 11/390,241

(22) Filed: Mar. 28, 2006

(65) Prior Publication Data

US 2006/0241474 A1    Oct. 26, 2006

(30) Foreign Application Priority Data

Mar. 29, 2005    (JP)    ............... 2005-096080

(51) Int. Cl.
*H01L 41/053*    (2006.01)
(52) U.S. Cl. .................. 73/632; 310/336; 367/188
(58) Field of Classification Search .................. 73/632; 340/435; 367/99, 188; 310/336
See application file for complete search history.

(56) References Cited

U.S. PATENT DOCUMENTS

| 6,085,592 | A  | * | 7/2000 | Kawashima | ................. | 73/632 |
| 6,520,019 | B1 | * | 2/2003 | Schon et al. | ................. | 73/632 |
| 6,532,193 | B1 | * | 3/2003 | Fehse et al. | ................. | 367/140 |

FOREIGN PATENT DOCUMENTS

| EP | 0 881 624 B1 | 4/2003 |
| JP | 58-101600 | 6/1983 |
| JP | 2-36700 | 2/1990 |
| JP | 2-243098 | 9/1990 |
| JP | 3-34399 | 4/1991 |
| JP | 4-116498 | 10/1992 |
| JP | 7-36639 | 4/1995 |
| JP | 8-130795 | 5/1996 |
| JP | 11-133136 | 5/1999 |
| JP | 11-187491 | 7/1999 |
| JP | 2002-78089 | 3/2002 |
| JP | 2004-104521 | 4/2004 |

* cited by examiner

*Primary Examiner*—John E Chapman
(74) *Attorney, Agent, or Firm*—Nixon & Vanderhye PC

(57) ABSTRACT

An ultrasonic sensor includes an ultrasonic transducer and a case. The ultrasonic transducer has a housing in a cylindrical shape with a bottom attached thereto, a piezoelectric device disposed in the housing, a connection pin electrically coupled with the piezoelectric device and a base made of an insulation material for supporting the connection pin extendingly piercing therethrough. The case has an opening for assembly operation of the ultrasonic transducer disposed therein. The piezoelectric device is electrically coupled with a circuit board in the case by using the connection pin and the connection pin is partially protected by a protector portion of the ultrasonic transducer. The case has a guide portion between the ultrasonic transducer and the circuit board for positioning the protector portion in the case.

15 Claims, 5 Drawing Sheets

ULTRASONIC SENSOR

CROSS REFERENCE TO RELATED APPLICATION

This application is based on and claims the benefit of priority of Japanese Patent Application No. 2005-96080 filed on Mar. 29, 2005, the disclosure of which is incorporated herein by reference.

FIELD OF THE INVENTION

The present invention generally relates to an ultrasonic sensor.

BACKGROUND OF THE INVENTION

Conventionally, an ultrasonic sensor includes an ultrasonic transducer that has a piezoelectric device disposed on an inside of a bottom of a housing in a cylindrical shape, and a case having an opening for an assembly of the ultrasonic transducer inserted therethrough. The piezoelectric device is electrically coupled with a circuit board in the case with a lead wire. The lead wire is covered with sealing except for portions for electrical coupling. Japanese Patent Application No. 2004-159351 discloses an ultrasonic sensor having above-described structure.

In recent years, demand for use of a connector pin in place of the lead wire is gradually increasing because of an expected improvement in ease of assembly. For example, the ultrasonic transducer disclosed in Japanese Patent Application JP-A-H8-130795 or JP-A-H11-187491 has the connection pin (terminal pin, or lead terminal) on a base (terminal board) fixed on the housing, the connection pin extending toward outside of the housing in a piercing manner. The piezoelectric device in the ultrasonic transducer is electrically coupled with the circuit board by the connection pin.

However, the ultrasonic transducer disclosed in Japanese Patent Application JP-A-H8-130795 or JP-A-H11-187491 has the connection pin, one end portion (i.e., a root portion) of which is fixedly disposed on the base in a flat board shape in the housing, and a portion of the connection pin (i.e., a tip portion) extending outside of the housing is long relative to the portion of the connecting pin inside the housing. In addition, the connection pin is made of, for example, a material mainly containing copper in a thickness of 0.5 millimeter in diameter. Therefore, the connection pin may be bent (deformed) before being disposed on the case, that is, the terminals of the device may be bendingly displaced from a standard position. In this manner, the assembly of the device may be increasingly difficult because of the deformation/dislocation of the connection pin (the terminal pin). In other words, the ease of assembly of the ultrasonic sensor may be deteriorated.

Further, water intruded from a gap between the case and the transducer into the case may immerse an inner part of the ultrasonic sensor depending on a state of the assembly. In this case, the connection pin in the sensor may be corroded or may be short-circuited because of the intruded water.

SUMMARY OF THE INVENTION

In view of the above-described and other problems, the present invention provides an ultrasonic sensor that has an improved workability and an improved waterproof property.

The ultrasonic sensor of the present invention includes an ultrasonic transducer and a case. The ultrasonic transducer has a housing in a cylindrical shape with a bottom attached thereto, a piezoelectric device disposed in the housing, a connection pin electrically coupled with the piezoelectric device and a base made of an insulation material for supporting the connection pin extendingly piercing therethrough. The case has an opening for assembly operation of the ultrasonic transducer disposed therein. The piezoelectric device is electrically coupled with a circuit board in the case by using the connection pin and the connection pin is partially protected by a protector portion of the ultrasonic transducer. The case has a guide portion between the ultrasonic transducer and the circuit board for positioning the protector portion in the case.

The ultrasonic sensor of the present invention protects the connection pin from an unexpected bending and/or curving by providing the protector portion. Further, the guide portion on the case suitably positions the protector portion and the connection pin disposed therein for an improved workability in terms of connection to the circuit board. Furthermore, coverage for a predetermined portion of the connection pin extending from the base toward a tip portion outside of the housing by the protector portion made of the insulation material having waterproofing property improves waterproofing property of the ultrasonic sensor.

In another aspect of the present invention, the ultrasonic sensor may provide the base that is disposed on the housing with an elastic member interposed therebetween. In this manner, the ultrasonic sensor has an improvement in terms of prevention of an unnecessary vibration transferred from the bottom of the housing to the base.

In yet another aspect of the present invention, the ultrasonic sensor may provide an integrated protector portion for a plurality of the connection pins. In this manner, the protector portion effectively serves for protection of the connection pins from bending and/or curving. Further, the protector portion and a positioning through hole (the guide portion) are coupled in a one-on-one correspondence, thereby reducing a possibility of mis-positioning.

In still another aspect of the present invention, the ultrasonic sensor may have the protector portion that has a protruding shape made of a same material as the base, or the protector portion that is a separate member being fixedly disposed on the base.

In still yet another aspect of the present invention, the ultrasonic sensor may provide the guide portion that is a guide board having the positioning through hole for positioning the protector portion. In this case, the protector portion is inserted into the positioning through hole for suitably positioning the connection pin relative to a connection portion on the circuit board.

In still yet another aspect of the present invention, the ultrasonic sensor may provide the guide portion that separates an inner space of the case, the protector portion that has a tip portion at least being exposed from the guide portion toward a circuit board side, and the tip portion that is covered by a dampproof member filled in the circuit board side. In this case, at least a portion of the protector portion is inserted into the positioning through hole in the guide portion.

In still yet another aspect of the present invention, the ultrasonic sensor may provide the guide portion that has a through hole being different from the positioning through hole. In this case, the through hole is either having no compatibility with a shape of the protector portion, that is, having a different shape from the shape of the protector portion or being provided in a position where the through hole can not accept the protector portion by mistake.

In still yet another aspect of the present invention, the ultrasonic sensor may have the shape of the protector portion and/or the positioning through hole being asymmetrically defined around an axis of the ultrasound transducer, when the housing of the transducer has the bottom of a circular shape, and the transducer has respectively different directivities in a horizontal direction and in a vertical direction. In this manner, the ultrasonic sensor has a directivity aligned in an expected direction. Further, the connection pin, the protector portion and the positioning through hole being eccentrically positioned around an axis of the ultrasonic transducer may have the same effect on the directivity.

In still yet another aspect of the present invention, the ultrasonic sensor may have a first elastic body disposed between the ultrasonic transducer and the guide portion for controlling vibration. In this manner, the unnecessary vibration from the housing is prevented, thereby improving the accuracy of the sensor. Further, a second elastic body disposed on the base that faces the protector portion of the transducer improves the damping effect. The elastic material of the first and the second body may be a same material, or may be a different material.

In still yet another aspect of the present invention, the ultrasonic sensor may provide the ultrasonic transducer that has a cylindrical elastic body coveringly disposed thereon in an assembly onto the case. The ultrasonic transducer has a first marker being exposed when the cylindrical elastic body is disposed on the ultrasonic transducer, and the cylindrical elastic body has a second marker on an outer circumferential surface as a positioning reference to the first marker. The case has a third marker as a positioning reference to one of the first and the second markers. The cylindrical elastic body for damping the vibration from the bottom of the housing makes it difficult to conduct controlled adjustment between the elastic body and the transducer once the elastic body is coveringly disposed on the transducer. Further, the cylindrical side face of the housing is covered by the cylindrical elastic body. Therefore, the ultrasonic sensor having the above-described structure has an improved assembling accuracy of the components, such as the transducer, the elastic body and the case.

In still yet another aspect of the present invention, the ultrasonic sensor may have the first marker formed on the base that has a tip portion protruding outwardly from the outer circumferential surface of the cylindrical elastic body positioned in the case, the second marker that is one of a projection in a direction of insertion of the elastic body into the case having its height being lower than the tip portion and a depression formed on the outer circumferential surface of the elastic body, and the third marker that is a depression formed from the opening in a direction of insertion of the ultrasonic transducer into the case for orienting the tip portion of the first marker. This structure of the ultrasonic sensor may be considered as a working example of the present invention.

In still yet another aspect of the present invention, the ultrasonic sensor may have the case that is disposed in a bumper of a vehicle. In this manner, the ultrasonic sensor may serve as a corner sensor or a reverse travel sensor of a vehicle.

In still yet another aspect of the present invention, the ultrasonic transducer may provide the housing in the cylindrical shape with the bottom attached thereto, the piezoelectric device disposed on an inner surface of the bottom in the housing, the connection pin electrically coupled with the piezoelectric device with one end extending outwardly from the housing, the base made of an insulation material for supporting the connection pin piercing therethrough in a fixation on the housing, and the protector portion made of the insulation material having waterproofing property for covering a predetermined portion of the connection pin extending from the base toward a tip portion outside of the housing. The positions of the connection pin and the protector portion are eccentrically arranged around the axis of the circular shape of the transducer.

The ultrasonic transducer having the above-described structure may provide an improved positioning workability between the connection pins of the transducer and the circuit board, because the connection pin in the protector portion is protected from an unexpected bending and/or curving.

Further, the protector portion is made of a material having waterproofing property. In this manner, the connector pin has an improved waterproofing property.

Furthermore, the transducer has a fixed orientation of assembly by having eccentrically arranged connection pins and protector portion around the axis of the transducer. In this manner, mis-assembly of the ultrasonic transducer in terms of the directivity is prevented.

In still yet another aspect of the present invention, the ultrasonic transducer may have an improvement in terms of prevention of the unnecessary vibration from the housing by having the base disposed on the housing with an interposing spacer made of the elastic material.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Embodiments of the present invention are described with reference to the drawings.

First Embodiment

Figure 1A:
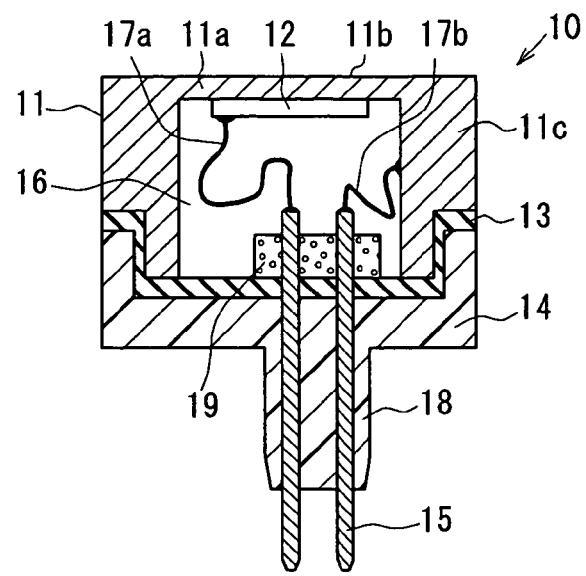
FIG. 1A shows a cross sectional view of a ultrasonic transducer in a ultrasonic sensor in a first embodiment of the present invention.
Figure 1B:
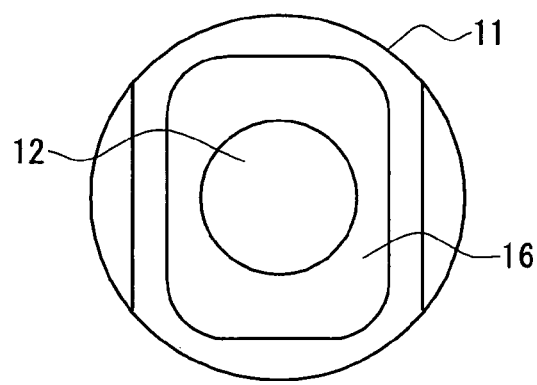
FIG. 1B shows a bottom view of a housing of the ultrasonic sensor in the first embodiment.
Figure 1C:
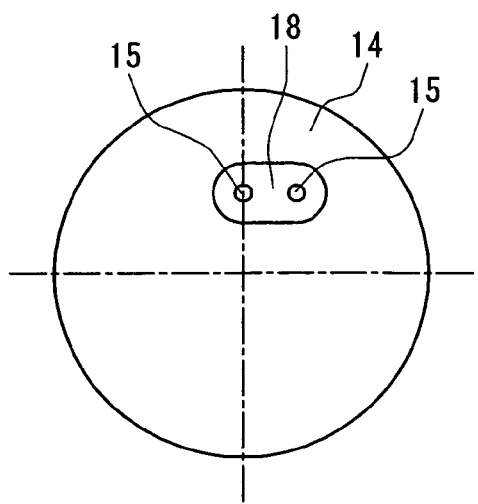
FIG. 1C shows a bottom view of a base of the ultrasonic sensor in the first embodiment.

FIG. 1A to 1C show illustrations of a ultrasonic transducer 10 in a ultrasonic sensor 100 in a first embodiment of the present invention. That is, FIG. 1A is a cross-sectional view, FIG. 1B is a bottom view of a housing 11, and FIG. 1C is a bottom view of a base 14 of the transducer 10. FIGS. 1B and 1C are views taken from a bottom side of a vibration surface of the housing 11. FIG. 1B shows an illustration that the housing 11 has only a piezoelectric device 12 disposed therein. The ultrasonic sensor of the present embodiment is used as a back sonar or a corner sonar.

The ultrasonic transducer 10 includes the housing 11 having a bottom in a cylindrical shape, the piezoelectric device 12, the base 14 disposed in an opening of the housing 11 with a spacer 13, and a connection pin 15 in an electrical connection with the piezoelectric device 12 on one end. The other end of the connection pin 15 pierces the base 14 to be extended toward an outside of the housing 11.

The housing 11 is made of a conductive material (a metal or an insulation material with a metallic coat formed thereon). The housing 11 has an inner space 16 formed therein. A bottom 11a of the housing 11 has the piezoelectric device 12 being pasted on an inner surface. An outer surface of the bottom 11a is a vibration surface 11b. In the present embodiment, the conductive material is an aluminum, and the vibration surface 11b is in a circular shape. The inner space 16 is a rectangular shape having respectively different length and width (corners of the rectangular shape are rounded) as shown in FIG. 1B. The shape of the inner space 16 defines directivity of the transducer 10, that is, respectively different directivities in a horizontal and a vertical direction. In this case, the directivity of the transducer 10 is wide in the horizontal direction and narrow in the vertical direction.

The piezoelectric device 12 includes a piezo-ceramic element (e.g., lead zirconate titanate) having electrodes on both surface (not shown in the figure), and one of the electrode of the surface is attached to the bottom 11a of the housing 11 by using a conductive adhesive. The electrodes are in electrical coupling with a pair of the connection pins 15 by using a lead 17a and a lead 17b through the housing 11. The inner space 16 of the housing 11 is filled with a felt and a silicon from the piezoelectric device 12 side poured from a hole (not shown in the figure) disposed on the spacer 13 and the base 14 when the leads 17a, 17b are soldered. These fillings are members for controlling an unnecessary vibration transferred from the vibration surface to the connection pins 15.

The spacer 13 is an elastic body for controlling transfer of the unnecessary vibration on a cylinder 11c of the housing 11 caused by the vibration of the bottom 11a of the housing 11. The spacer 13 is made of, for example, a silicone rubber. The spacer 13 used in the present embodiment may be omitted.

The base 14 is made of an insulation material for having the connection pin 15 piercingly disposed therethrough. The insulation material of the present invention is, for example, a synthetic material such as an ABS resin. The connection pins 15 are laid in the base 14 by using insert molding. The connection pin 15 is mainly made of cupper, and has a thickness of 0.5 mm in diameter.

The ultrasonic transducer 10 of the present embodiment has a protector portion 18 that is made of the insulation material having waterproofing property. The protector portion 18 protects a predetermined portion of a tip portion of the connection pin 15 extending toward an outside of the housing 11. The protected predetermined portion extends from the base 14 toward the tip portion on the outside of the housing 11. The protector portion 18 in the present embodiment is a protruding portion of the base 14 as shown in FIGS. 1A and 1C. The connection pin 15 is inserted into the base and the protector portion 18. A single body of the protector portion 18 covers a pair of the connection pins 15.

The protector portion 18 of the present embodiment having the pins 15 is eccentrically disposed from a center of a circular shape of the bottom 11a of the housing 11. That is, the protector portion 18 is disposed differently from the center of the bottom 11a shown in FIG. 1C as a cross point of dashed lines. In this case, a detection axis of the transducer 10 (the piezoelectric device 12) coexists with the center of the bottom 11a or an axis of the housing 11.

The protector portion 18 is separately formed from the base 14, and may be attached on the base 14 by, for example, using an adhesive. The pins 15 may be separately covered and protected. The pins 15 may be attached to a predetermined position of the base 14 and the protector portion 18 by using an adhesive instead of using insert molding.

The ultrasonic transducer 10 includes a foamed elastic body 19 as a damper. The foamed elastic body of the present invention is a foamed silicon. The connection pin 15 pierces the foamed elastic body 19. The housing 11, the spacer base 14, and the foamed silicon 19 are attached to each other by using an adhesive (e.g., a silicon type adhesive).

Figure 2A:
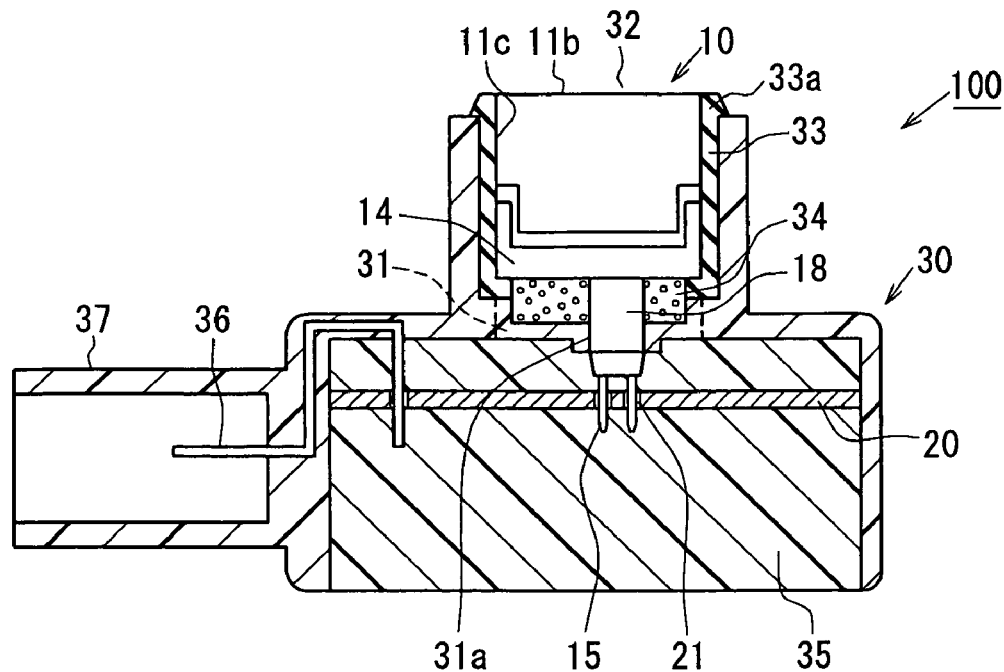
FIG. 2A shows a cross sectional view of the ultrasonic sensor in FIG. 1A in the first embodiment.
Figure 2B:
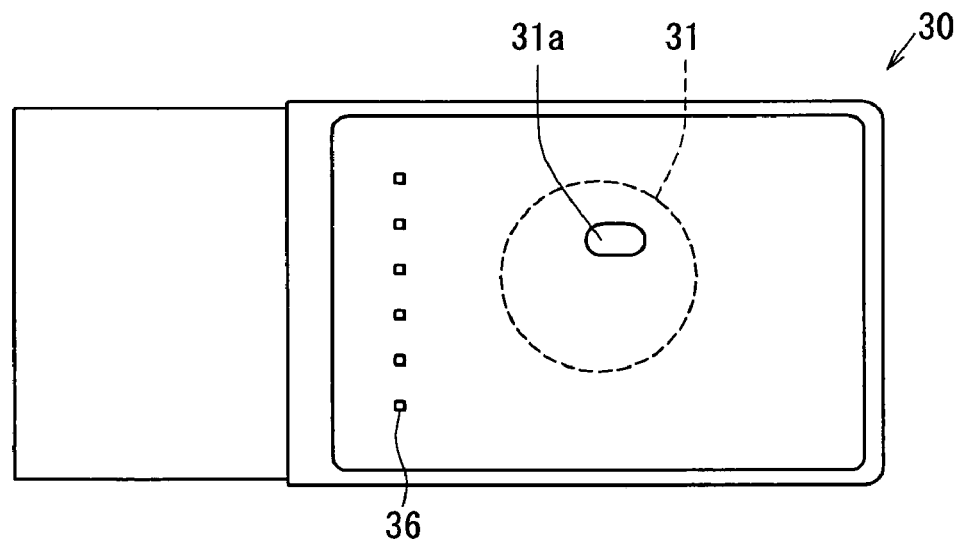
FIG. 2B shows a bottom view of the case of the ultrasonic sensor in the first embodiment.

FIGS. 2A and 2B show illustrations of the ultrasonic sensor 100 in FIG. 1A in the first embodiment. That is, FIG. 2A shows a cross-sectional view, and FIG. 2B shows a bottom view of a case 30 of the sensor 100 taken from a reverse side of the disposition surface of the transducer 10. In FIG. 2A, electrical components on a circuit board 20 are omitted for illustration purposes. In FIG. 2B, only the case 30 is illustrated. Further, a boundary between the case 30 and a guide portion 31 is shown as a broken line.

The ultrasonic sensor 100 includes the ultrasonic transducer 10 and the circuit board 20 for applying voltage on the transducer 10 to generate the ultrasonic wave and for processing voltage induced by a reverse effect of the transducer 10. The transducer 10 and the board 20 are disposed in the case 30 that is made of synthetic resin.

The case 30 has the guide portion 31 for positioning the pin 15 and the protector portion 18 against a connection portion of the circuit board 20 in a hollow space. The guide portion 31 is a positioning hole 31a for positioning of the transducer 10 on the case 30 and positioning of the pins 15 on the circuit board 20. The hole 31a is disposed on a board that separates the hollow space of the case 30 into a space for the transducer 10 and a space for the circuit board 20. The hole 31a receives the protector portion 18 in a piercing manner. The guide portion 31 is integrally formed with the case 30 with a same material as the case 30.

The case 30 has an opening 32 in a circular shape, and receives insertion of the transducer 10 with a cylindrical elastic body 33 attached thereon from the opening 32 side in a direction toward the guide portion 31. The transducer 10 has a foamed elastic body 34 on a lower side of the base 14 for controlling vibration. The vibration surface 11b of the transducer 10 is exposed in a state of assembly in the case 30.

The cylindrical elastic body 33 made of a silicon rubber covers a side surface (i.e., the cylinder 11c of the housing 11) of the transducer 10 for controlling transfer of the unnecessary vibration from the transducer 10 to the case 30. An edge on the opening 32 side of the cylindrical elastic body 33 has a locking part 33a, and the case 30 and the guide portion 31 is locked by the locking part 33a. The transducer 10 is fixed on the case 30 by using the locking part 33a. A locking part on an insertion side of the transducer 10 (not shown in the figure) is locked on the circuit board 20 side of the guide portion 31 through a through hole (not shown in the figure) on the guide portion 31.

The foamed elastic body 34 made of a foamed silicon (same as the elastic body 19 in the housing 11 of the transducer 10) has the pins 15 and the protector portion 18 pierced therethrough. The elastic body 34 has a cut for positioning the protector portion 18 and the pins 15 in a predetermined position. The transducer 10, the base 14, the cylindrical elastic body 33, and the foamed elastic body 34 are attached to each other by a silicon type adhesive.

The space on the circuit board 20 side in the case 30 separated by the guide portion 31 is filled with a dampproof member 35. The dampproof member 35 is, for example, a silicon resin or a urethane resin. The dampproof member 35 of the present embodiment is a silicon resin. A terminal 36 in FIGS. 2A and 2B is an output terminal from the circuit board 20, and a connector 37 is one end of the terminal 36 extended toward an opening portion.

Assembly of the transducer 10 on the case 30 is described in the following. The transducer 10 having the cylindrical elastic body 33 and the foamed elastic body 34 attached thereon is inserted from the opening 32 of the case 30. In the course of insertion, the protector portion 18 having pins 15 is inserted into the positioning hole 31a in the guide portion 31 on the case 30. In this manner, the case 30 has the transducer 10 in a predetermined position, and the pins 15 are disposed in a through hole 21 on the circuit board 20. The pins 15 are soldered on the circuit board 20 for an electrical coupling between the piezoelectric device 12 and the circuit board 20. The terminal 36 and the circuit board 20 are also electrically coupled by soldering for an electrical output. The circuit board 20 side space of the case is filled with the dampproof member 35 after soldering. The circuit board 20 may be disposed in the case 30 before or after disposing the transducer 10. An opening of the case 30 on the circuit board 20 side may be covered by some material.

The present embodiment of the ultrasonic sensor is assembled in an above-described manner, that is, the pins 15 of the transducer 10 are protected by a protector portion 18 and the protector portion 18 is inserted in the guide portion 31 having the positioning hole 31a. Therefore, bending/curving of the pins 15 are prevented for an improved workability.

Further, the transducer 10 and the sensor 100 have an improved resistance against intrusion of water through a gap between the transducer 10 and the cylindrical elastic body 33 in terms of corrosion and leakage, because of the coverage by the protector portion 18 over the pins 15 for a portion from the base 14 to the guide portion 31. Furthermore, coverage of the protector portion 18 for the pins 15 extends over a portion exposed for the hollow space in the case from the guide portion 31 toward the circuit board 20 (i.e., the protector portion 18 ends before reaching the circuit board 20) when the transducer 10 is positioned in the case 30. That is, the pins 15 protruding from the base 14 are completely covered by the protector portion 18 and the dampproof member 35 for an improvement of water resistance. Furthermore, a gap between the protector portion 18 and the circuit board 20 prevents transfer of the vibration from the protector portion 18 to the circuit board 20.

The eccentric positioning of the protector portion 18 (the pins 15) and the guide portion 31 (the positioning hole 31a) from the center of the housing 11 serves for a fool-proof assembly of the transducer 10 on the case 30, or assembly of the ultrasonic sensor 100 in terms of direction of the directivity of the sensor 100. The eccentric structure effectively serves as a prevention measure of mis-assembly when the sensor 100 has respectively different directivities in a horizontal and a vertical directions.

The foamed elastic body 34 and 19 on the base 14 effectively serves as a prevention measure for controlling the unnecessary vibration transferred from the pins 15 to the circuit board 20.

Second Embodiment

A second embodiment of the present invention is described with reference to the drawings.

Figure 3A:
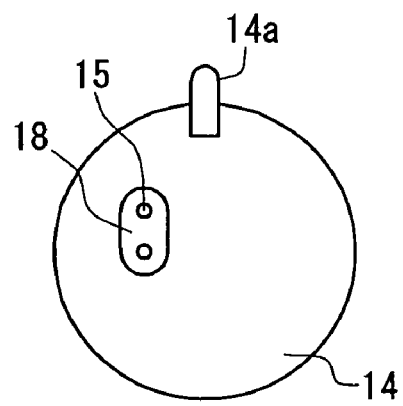
FIG. 3A shows a bottom view of the ultrasonic transducer in a second embodiment.
Figure 3B:
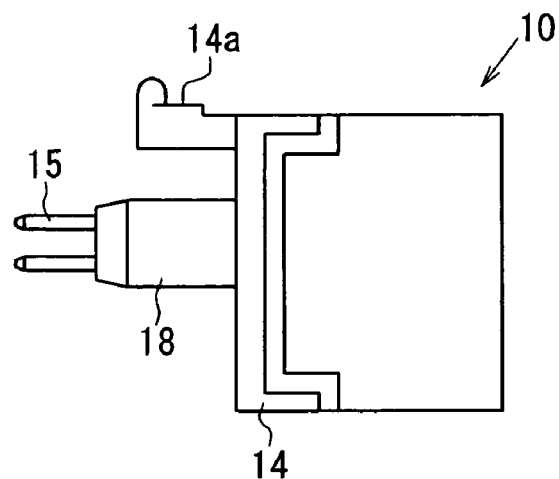
FIG. 3B shows a side view of the ultrasonic transducer in the second embodiment.

FIGS. 3A and 3B show illustrations of the ultrasonic transducer 10 in the present embodiment. That is, FIG. 3A shows a bottom view of the ultrasonic transducer taken from the protector portion 18 formation side, and FIG. 3B shows a side view of the ultrasonic transducer.

Figure 4A:
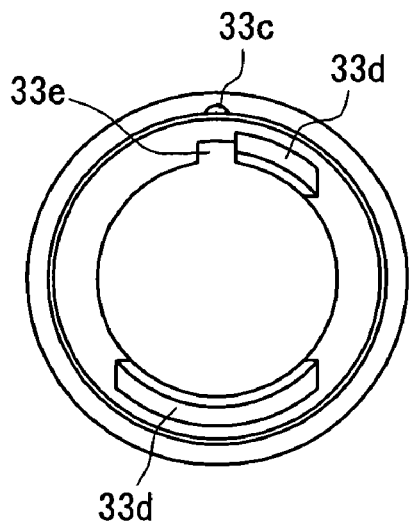
FIG. 4A shows a bottom view (i.e., a case facing side) of a cylindrical elastic body in the second embodiment.
Figure 4B:
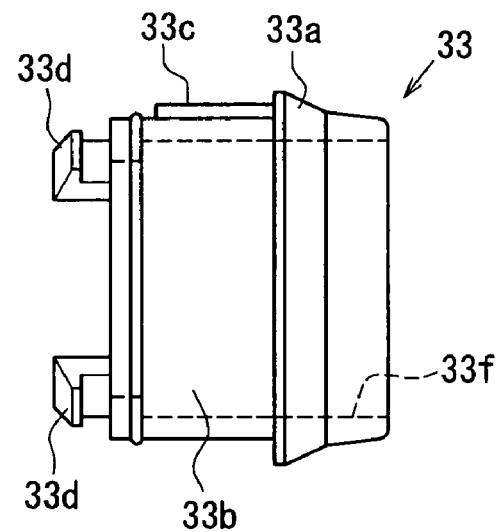
FIG. 4B shows a side view of the cylindrical elastic body in the second embodiment.

FIGS. 4A and 4B show illustrations of the cylindrical elastic body 33. That is, FIG. 4A shows a bottom view (i.e., a case facing side) of the cylindrical elastic body 33, and FIG. 4B shows a side view of the cylindrical elastic body 33.

Figure 5A:
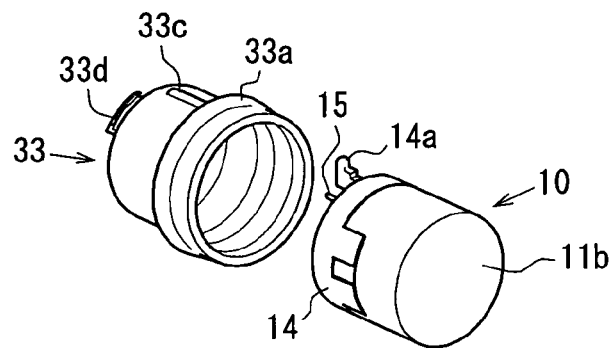
FIG. 5A shows a perspective exploded view of the ultrasonic transducer and the cylindrical elastic body.
Figure 5B:
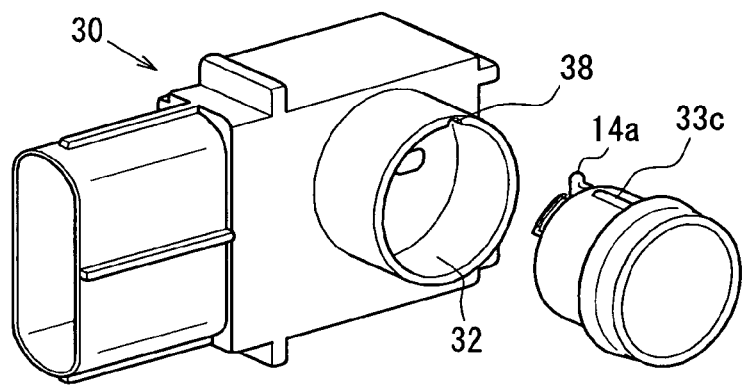
FIG. 5B shows a perspective exploded view of the case and the ultrasonic transducer.

FIGS. 5A and 5B show the exploded views in perspective. That is, FIG. 5A shows a perspective exploded view of the ultrasonic transducer 10 and the cylindrical elastic body 33, and FIG. 5B shows a perspective exploded view of the case 30 and the ultrasonic transducer 10.

Focus of the description of the second embodiment is placed on differences between the first and the second embodiments. That is, the positioning of the ultrasonic transducer 10 relative to the cylindrical elastic body 33 and the case 30 is mainly described.

Transfer of the unnecessary vibration caused by the vibration of the bottom 11a of the housing 11 is prevented by the cylindrical elastic body 33. However, control of positioning of the elastic body 33 relative to the transducer 10 is difficult after the elastic body 33 is disposed on the transducer 10. Further, the cylinder 11c of the housing 11 is covered by the elastic body 33.

The positioning of the transducer 10 relative to the elastic body 33 and the case 30 is more practically described in the following. That is, the base 14 of the transducer 10 has a first marker 14a on an outer surface, where a tip of the first marker 14a protrudes toward outwardly from an outer surface 33b of the cylindrical elastic body 33 when the elastic body 33 is disposed on the transducer 10. The outer surface 33b of the elastic body 33 has a second marker 33c that protrudes along a direction of insertion of the elastic body 33, the second marker 33c having a lower height than the first marker 14a. The opening 32 of the case 30 for receiving the transducer 10 has a third marker 38 that guides the tip of the first marker 14c along a direction of insertion of the transducer 10. FIGS. 4A and 4B show a locking part 33d on the cylindrical elastic body 33, and the locking part 33d is inserted into a through hole that is disposed separately from the positioning hole 31a in the guide portion 31 for locking the case 30 with an assistance of the other locking part 33a. Further, a cut 33e on the elastic body 33 receives the first marker 14a. Furthermore, a broken line 33f shows an inner surface of the cylindrical elastic body 33 for protecting the side face of the transducer 10 and a portion of the protector portion 18.

The tip of the first marker 14a is aligned with the second marker 33c, and protrudes from the outer surface 33b of the elastic body 33 when the transducer 10 is inserted into the elastic body 33 having the first marker 14a aligned with the second marker 33c. Then, the protector portion 18 is inserted into the positioning hole 31a of the guide portion 31 and the pins 15 are inserted into through holes 21 on the circuit board 20 when the tip of the first marker 14a is guided by a third marker 38 on the case 30 in the course of insertion of the transducer 10 into the case 30. Further, the locking part 33d and 33a of the elastic body 33 inserted into through holes (not shown in the figure) lock the transducer 10 onto the case.

The ultrasonic sensor 100 of the present embodiment assures an improved accuracy of assembly operation of the ultrasonic transducer 10 onto the cylindrical elastic body 33 and the case 30 in an above-described manner. Further, misassembly of the ultrasonic transducer 10 is prevented in terms of the respectively different directivities in the horizontal and vertical directions of the transducer 10 when the cylindrical elastic body 33 for controlling the unnecessary vibration is disposed on the transducer.

Further, the shapes of the first marker 14a, the second marker 33c, and the third marker 38 are not necessarily limited to those in the present embodiment. The first marker 14a may at least protrude from the elastic body 33 when the elastic body covers the transducer 10, and the second marker 33c may at least be used for positioning the first marker 14a. The third marker 38 may at least be used for positioning the first marker 14a and the second marker 33c.

Other Embodiment

Although the present invention has been fully described in connection with the preferred embodiment thereof with reference to the accompanying drawings, it is to be noted that various changes and modifications will become apparent to those skilled in the art.

Figure 6:
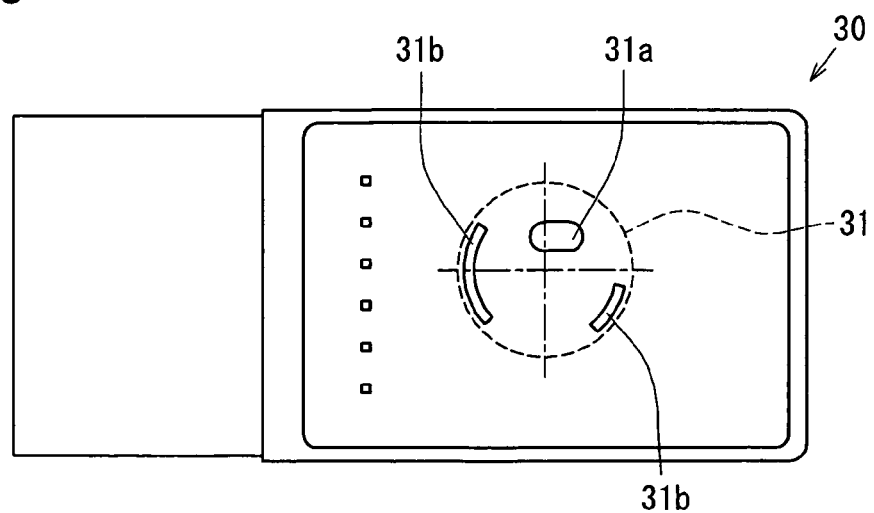
FIG. 6 shows an illustration of modification on a guide portion.
Figure 7:
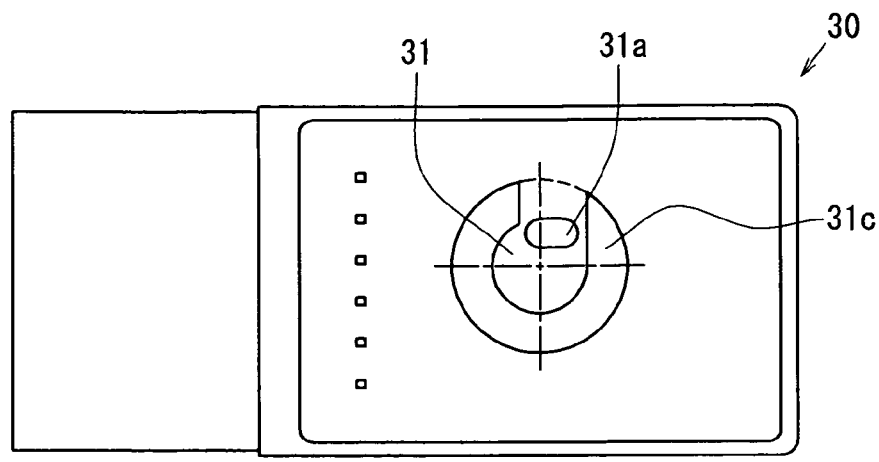
FIG. 7 shows an illustration of a different type of modification on the guide portion.

For example, the guide portion 31 for positioning the protector portion 18 may be differently structured. That is, for example, a separate through hole 31b for accepting the locking part 33d may be disposed in combination with the positioning hole 31a as shown in FIG. 6. Further, a through hole 31c for accepting the dampproof member 35 may be disposed in a space between the base 14 of the transducer 10 and the case 30 when the foamed elastic body 34 is not used as shown in FIG. 7. Furthermore, positions of the through holes 31b and 31c may preferably be arranged in a manner that the protector portion 18 cannot be mistakenly inserted into the holes 31b and 31c even when the transducer 10 is rotated around the axis (a cross point of the dashed lines in FIGS. 6 and 7) of the transducer 10 when the through holes 31b and 31c are separately disposed from the positioning hole 31a in the guide portion 31. Plan views of the modification of the guide portion 31 is shown in FIGS. 6 and 7. The modification of the guide portion 31 is clearly recognized when compared with an original arrangement in FIG. 2B.

Furthermore, the guide portion 31 may guide the protector portion 18 in a different manner. For example, the protector portion 18 may be guided by using a depression or a gutter formed on a board portion.

Figure 8:
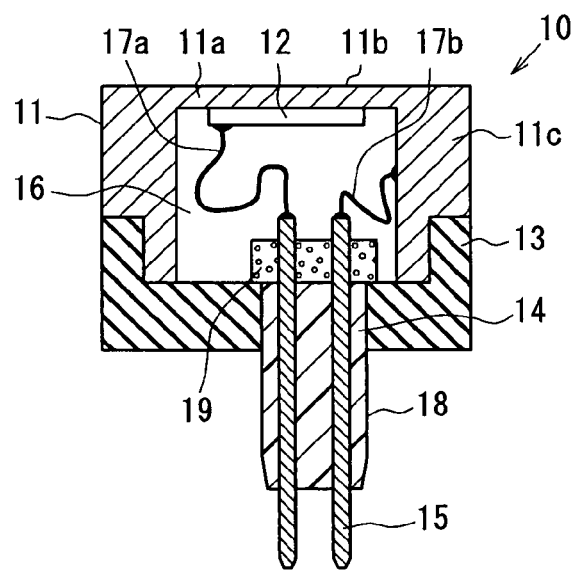
FIG. 8 shows a cross section of the ultrasonic transducer having a modification.

The base 14 may or may not be disposed over the bottom side of the ultrasonic transducer 10. For example, the spacer 13 may substantially cover all area of the bottom side of the transducer 10, and the base may only disposed in a small area for accommodating the connection pins 15 as shown in FIG. 8. In this case, FIG. 8 shows a cross-sectional view of modification of the transducer 10.

Figure 9:
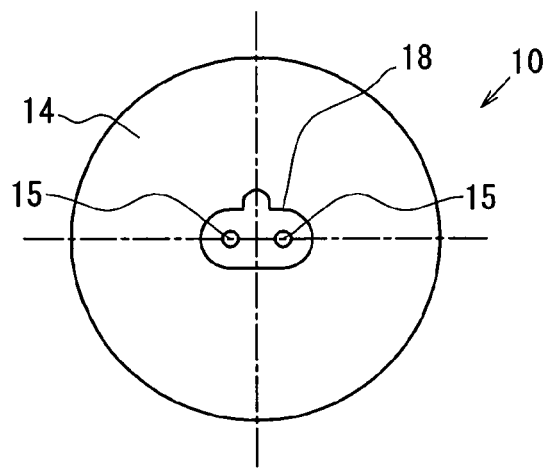
FIG. 9 shows an illustration of a protector portion having a modification.

Furthermore, eccentricity of the arrangement of the protector portion 18 and the pins 15 may be replaced by asymmetrical arrangement of the protector portion 18 around the axis of the transducer 10. That is, for example, the protector portion 18 and the positioning hole 31a are asymmetrically arranged around the axis of the transducer 10 (or, the axis of the housing 11) for defining a direction of directivity of the transducer 10 as shown in FIG. 9. In this case, the protector portion 18 may even be disposed on the axis of the transducer 10 for having an expected directivity.

Such changes and modifications are to be understood as being within the scope of the present invention as defined by the appended claims.

What is claimed is:

1. An ultrasonic sensor comprising: an ultrasonic transducer having: a housing in a cylindrical shape with a bottom attached thereto; a piezoelectric device disposed in the housing; a connection pin electrically coupled with the piezoelectric device; and a base made of an insulation material for supporting the connection pin extendingly piercing therethrough, wherein the piezoelectric device is disposed on an inside surface of the bottom of the housing; and a case having an opening for assembly operation of the ultrasonic transducer disposed therein, wherein the piezoelectric device is electrically coupled with a circuit board in the case by using the connection pin when the ultrasonic transducer is assembled in the case, the connection pin is partially protected by a protector portion of the ultrasonic transducer, the protector portion made of an insulation material having waterproofing property, and the case has a guide portion between the ultrasonic transducer and the circuit board for positioning the protector portion in the case.

2. The ultrasonic sensor according to claim 1, wherein the base is disposed on the housing with an elastic member interposed therebetween.

3. The ultrasonic sensor according to claim 1, wherein the protector portion collectively covers a plurality of the connection pins.

4. The ultrasonic sensor according to claim 1, wherein the protector portion has a protruding shape made of a same material as the base.

5. The ultrasonic sensor according to claim 1, wherein the protector portion is a separate member being disposed on the base.

6. The ultrasonic sensor according to claim 1, wherein the guide portion is a guide board having a positioning through hole for positioning the protector portion.

7. The ultrasonic sensor according to claim 6, wherein the guide portion divides an inner space of the case into an ultrasonic transducer side and a circuit board side,
the protector portion has a tip portion at least being exposed from the guide portion toward the circuit board side, and
the tip portion is covered by a dampproof member filled in the circuit board side.

8. The ultrasonic sensor according to claim 6, wherein the guide portion has another through hole that is different from the positioning through hole, and
the another through hole is one of a) a different shape than a shape of the protector portion and b) in a position that is different from a position of the protector portion.

9. The ultrasonic sensor according to claim 1, wherein the bottom of the housing of the ultrasonic transducer has a circular shape,
wherein the guide portion has a positioning through hole for positioning the protector portion,
the ultrasonic transducer has respectively different directivities in a horizontal direction and in a vertical direction, and the shape of the protector portion and/or the positioning through hole are asymmetrically defined around an axis of the ultrasound transducer.

10. The ultrasonic sensor according to claim 1,
wherein the ultrasonic transducer has the housing having the bottom of a circular shape,
the ultrasonic transducer has a respectively different directivity in a vertical direction and in a horizontal direction, and
positions of the connection pin, the protector portion and the positioning through hole are eccentrically positioned around an axis of the ultrasonic transducer.

11. The ultrasonic sensor according to claim 1,
wherein a first elastic body is disposed between the ultrasonic transducer and the guide portion.

12. The ultrasonic sensor according to claim 11,
wherein a second elastic body is disposed on the base, and the second elastic body faces the protector portion of the ultrasonic transducer.

13. The ultrasonic sensor according to claim 1,
wherein the ultrasonic transducer having a cylindrical elastic body coveringly disposed thereon is assembled onto the case,
the ultrasonic transducer has a first marker being exposed when the cylindrical elastic body is disposed on the ultrasonic transducer,
the cylindrical elastic body has a second marker on an outer circumferential surface as a positioning reference to the first marker, and
the case has a third marker as a positioning reference to one of the first and the second markers.

14. The ultrasonic sensor according to claim 13,
wherein the first marker formed on the base has a tip portion protruding outwardly from the outer circumferential surface of the cylindrical elastic body positioned in the case,
the second marker is one of a projection in a direction of insertion of the elastic body into the case having its height being lower than the tip portion and a depression formed on the outer circumferential surface of the elastic body, and
the third marker is a depression formed from the opening in a direction of insertion of the ultrasonic transducer into the case for orienting the tip portion of the first marker.

15. The ultrasonic sensor acoording to claim 1,
wherein the case is disposed in a bumper of a vehicle.

* * * * *